Patented Mar. 17, 1931

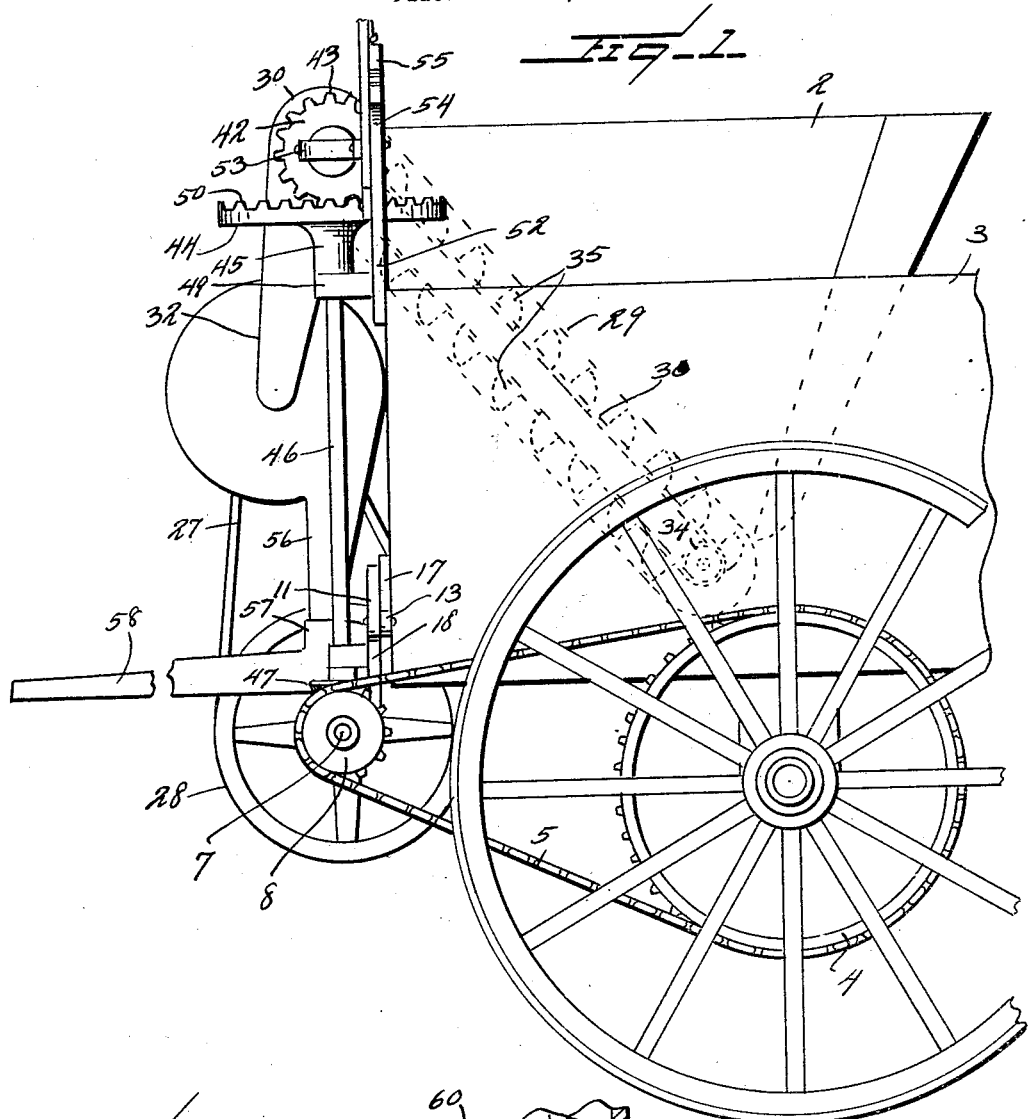
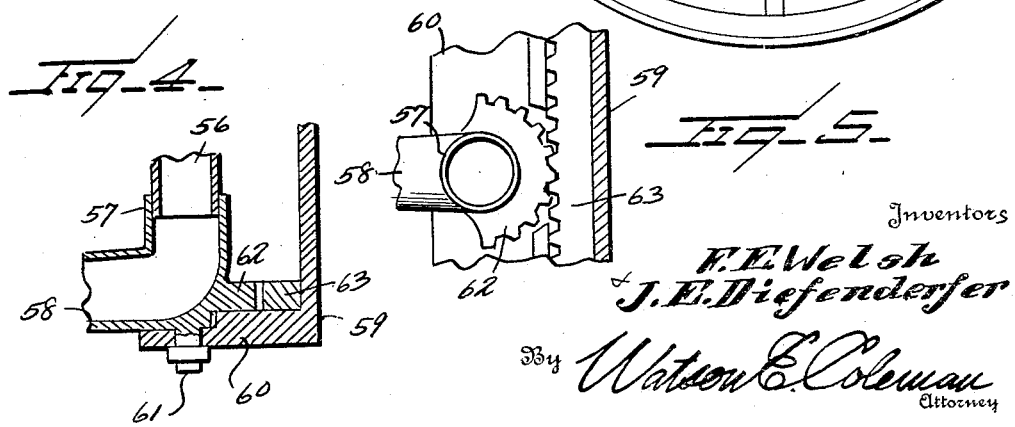

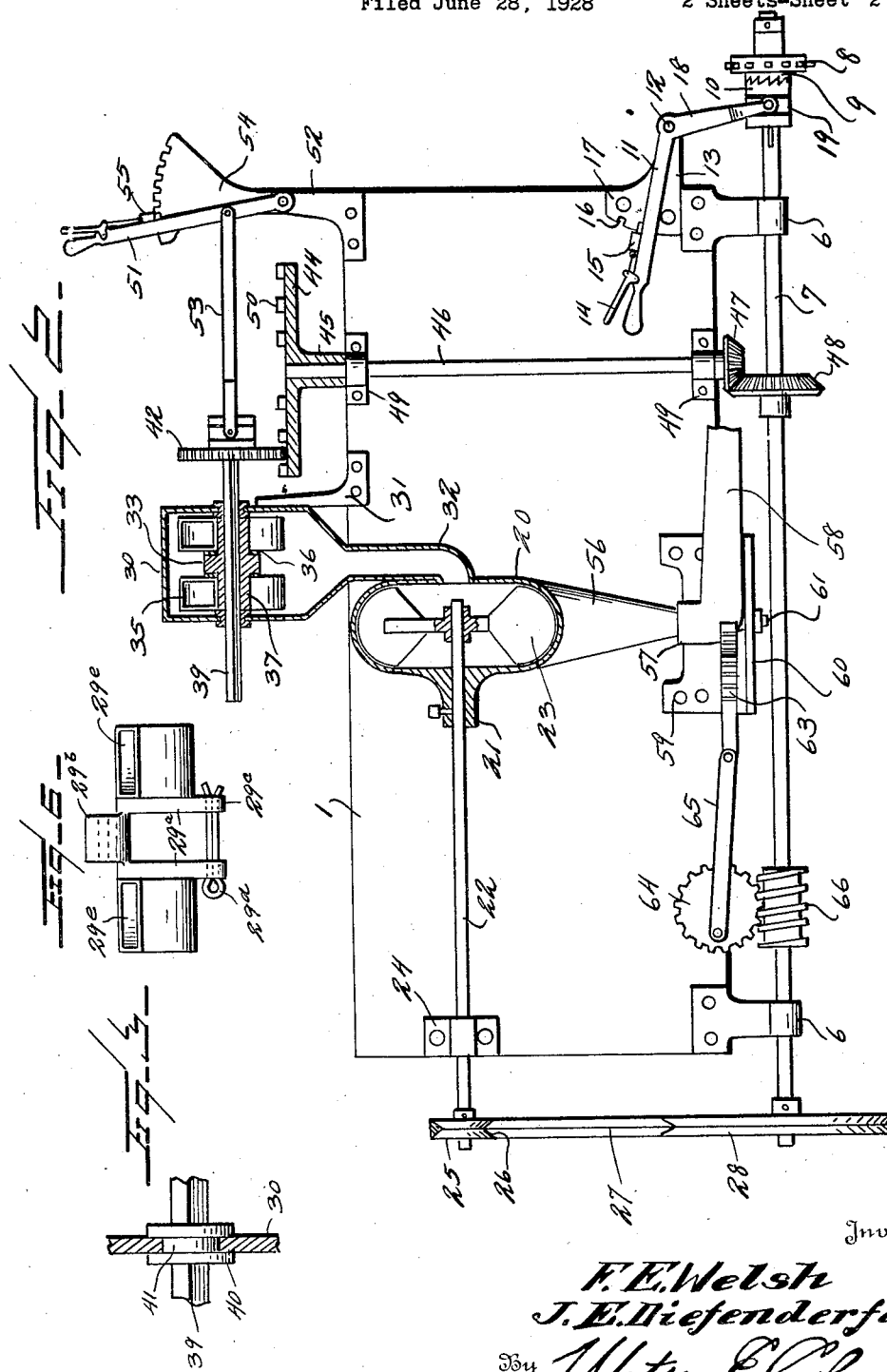

1,797,112

UNITED STATES PATENT OFFICE

FRANK E. WELSH AND JACOB E. DIEFENDERFER, OF WILLIAMSFIELD, ILLINOIS

SEED BROADCASTER

Application filed June 28, 1928. Serial No. 289,055.

This invention relates to a seeder or seed broadcasting device and has for its primary object the provision, in a manner as hereinafter set forth, of a mechanism designed to be mounted upon a wagon end gate and operated to rapidly and evenly distribute seed over a wide area.

Another object of the invention is to provide, in a manner as hereinafter set forth, in a seeder, an improved means for distributing the seed by air blast.

Another object of the invention is to provide, in a seed distributor, an improved type of oscillating blowing nozzle from which the seeds may be discharged over a large area.

A further object of the invention is to provide an improved speed changing mechanism for use in connection with a seed broadcasting device, by means of which the quantity of seed supplied to the distributor mechanism may be regulated.

Other objects and advantages of the present invention will become apparent as the description of the same proceeds and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in side elevation of the seeding mechanism embodying the present invention;

Figure 2 is a rear elevational view of the mechanism partly in section;

Figure 3 is a detail view of a bearing for a reciprocating rotary shaft;

Figure 4 is a vertical section taken through the lower portion of the distributing nozzle and actuating mechanism therefor;

Figure 5 is a view in plan of the rear portion of the distributing nozzle with a portion of the actuating rack associated therewith.

Figure 6 is a detail plan view of one conveyor link and a pair of cups carried thereby.

The present seed distributing mechanism is designed to be mounted upon the end gate of a wagon, which end gate may be of a type which can be readily removed from position, thus making it possible to employ the wagon for other purposes when not being used for broadcasting seed.

The wagon end gate is indicated by the numeral 1 and carries upon one side the seed hopper 2, which is located within the wagon when the mechanism is in position, and which is indicated as a whole by the numeral 3.

In order to obtain proper power for the operation of the seed distributor, the rear axle, or one of the rear wheels, may be provided with a sprocket wheel 4 over which a chain 5 may be trained.

Mounted in the bearing members 6 which are secured to the lower portion of the end gate 1, is an elongated rotary shaft 7 which extends transversely of the wagon projecting at each end beyond the sides thereof.

Upon the projecting end of the shaft 7 adjacent the driving sprocket wheel 4, a small sprocket wheel 8 is mounted to rotate freely about the shaft, over which the driving chain 5 passes. The inner face of this sprocket wheel is formed to set up clutch teeth 9.

Adjacent the inner face of the sprocket wheel 8, and keyed to the shaft 7 to slide thereon, is a clutch member 10, which is designed to engage the teeth 9 of the sprocket wheel when moved to position thereagainst. The movement of this clutch member 10 upon the shaft 7 is controlled by the lever 11 which is pivoted at one end as at 12 to a bracket member 13 mounted upon the adjacent end of the tail of the end gate 1. The swinging end of the lever 11 is provided with the usual latch controlling member 14 and latch 15 which engages the teeth 16 formed upon one edge of the plate 17 which forms a part of the bracket. By this means the lever 11 can be held in any adjusted position. At its pivoted end, the lever 11 carries the arm 18 which at its free end has pivotal engagement with a collar 19 mounted upon and surrounding the shaft 7 and which in turn is swivelly connected to the clutch member 10 in the usual manner.

Mounted upon the outer face of the end gate adjacent the central portion thereof is a circular blower fan housing or casing 20 at one side and upon the radial center of which a bearing 21 is formed through which a fan operating shaft 22 passes, the end of this shaft extending into the casing and supporting therein the fan blades 23 which are rotated thereby. This shaft 22 is supported adjacent its other end in a suitable bearing 24 which is located adjacent the end edge of the gate, the shaft projecting a substantial distance beyond this end edge and carrying thereon the pulley 25, the peripherial face of which is preferably provided with a V-groove 26.

The pulley 25 is connected by a suitable belt 27 with the relatively large drive pulley 28 which is mounted upon the adjacent end of the underlying shaft 7.

The seed to be distributed by the mechanism is conveyed from the hopper or bin 2 by a conveyor mechanism indicated generally by the numeral 29 and deposited into the receiving hopper 30 which is supported by the bracket 31 upon the top edge of the end gate from which hopper the seed passes downwardly through the conveying pipe 32 to and through the central portion of that wall of the fan casing opposite the wall through which the fan operating shaft 22 passes.

The conveyor 29 is of the endless type and consists of a pivotally connected series of U-shaped links 29ª each having a sleeve formed integral with the yoke thereof as indicated at 29ᵇ while at the free end of each leg is an eye 29ᶜ between which eyes the yoke of an associated link passes to receive a coupling cotter pin 29ᵈ which passes through the eyes and the yoke. Each leg of each link has secured to the outer side thereof the cup 29ᵉ, thus forming the conveyor of a pair of parallel carrying cups. The coupled links 29ª pass over suitable sprockets 33 and 34 which are located respectively in the receiving hopper and in the lower portion of the hopper bin.

The sprocket 33 is located within the seed receiving hopper 30 and has a relatively long hub 37 through which is formed a passage of polygonal cross sectional design which receives a similarly formed shaft 39 which extends transversely through the hopper. The shaft is designed to be shifted longitudinally through the sprocket hub 37 as will be hereinafter more fully described, and in order to permit rotation of the shaft 39, it is mounted in the walls in rotating bearings 40. The bearings 40 constitute centrally apertured disks, each having its periphery provided with a groove 41 in which the edge of the opening in the wall 30 in which the bearing is positioned, engages, thus permitting the bearing to rotate without lateral movement.

Upon one end of the shaft 39, there is mounted a small gear 42 having relatively widely separated teeth 43. This gear is positioned over a horizontally arranged disk 44, the under surface of the central portion of which is provided with the hub 45 into which one end of a vertical shaft 46 extends. This hub 45 may be arranged for support upon the top edge of the end gate 1 if desired to relieve longitudinal pressure on the shaft 46, the shaft extending across the outer face of the end gate to a point below the lower edge thereof where it supports a pinion gear 47 of the beveled type, which meshes with a smaller beveled gear 48 carried by and keyed to the horizontal drive shaft 7. Suitable bearings 49 may be attached to the end gate to maintain the shaft 46 in position.

The top surface of the disk 44 is provided with a plurality of concentrically arranged annular series of teeth or lugs 50, with any one of which annular series of lugs, the gear 42 is adapted to engage, the engagement with the selected series being effected by shifting shaft 39 longitudinally to move the gear toward or away from the center of the toothed disk 44. It is, of course, to be understood that for the proper operation of the structure, the radial center of the disk 44 must be in the same vertical plane as the shaft 39.

Movement of the shaft 39 is obtained through the medium of an operating lever 51 which is mounted in any appropriate manner as for example upon the bracket 52 secured to and carried by the end gate, and the connecting link 53, one end of which is pivotally attached to the lever above the pivotal point of the same while the other end is pivotally attached to the adjacent end of the shaft 39.

The bracket 52 may also support a toothed segment 54 with which a spring controlled pawl 55, carried by the lever 51, may engage to hold the lever in adjusted position.

The lowermost portion of the wall of the fan housing 20 has extending downwardly therefrom the chute 56 which discharges at its lower end into the upturned open end 57 of a horizontally mounted nozzle 58. Secured to the adjacent wall of the end gate at the lower end of the chute 56 is a supporting bracket 59 which carries an outwardly projecting shelf 60 upon which the rear end of the nozzle 58 rests. A pivot pin 59, projecting downwardly from the under portion of the nozzle at its inner end, has pivotal engagement in the supporting portion 60 of the bracket 59 and holds the nozzle for swinging movement.

The rear end of the nozzle also carries or has formed integrally therewith and concentric with the pivot pin 61, a gear segment 62, which gear segment is engaged by the reciprocating rack bar 63 which is mounted to slide upon and transversely of the portion 60 of the nozzle supporting bracket.

Pivotally mounted upon the end gate 1, preferably upon the side of the fan opposite that upon which the shaft 46 is located, is a spiral gear 64 to which is eccentrically attached one end of a pitman 65, the other end thereof being pivotally attached to the adjacent end of the rack 63.

The beveled gear 64 meshes with the worm gear 66 carried upon the underlying drive shaft 7, by means of which rotary motion is transmitted to the gear 64 to reciprocate the rack 63 and cause the swinging of the seed discharging nozzle 58.

From the foregoing description, it will be seen that in the use of the present seed distributing device, the seed will be carried from the hopper 2 by the conveyor 29 to and discharged into the seed receiving hopper 30, the power being furnished the conveyor through the medium of the drive shaft 7, the attached shaft 46 and the transmission mechanism which includes the meshed rotating elements 42 and 44, the element 42 being mounted upon the shaft 39 which supports the upper sprocket wheel over which the conveyor passes. The speed of the conveyor can be conveniently regulated or controlled by the lever 51 by means of which the element 42 and its supporting shaft can be shifted radially of the driving disk 44 to engage the element 42 with an inner annular series of lugs or teeth 50 when slow delivery of the seed to the receiver 30 is desired or to move the element outwardly for engagement with an outer series of teeth 50 when increased speed of delivery is desired.

Through the medium of the drive shaft, the belt connected pulley wheels 25 and 28 and the shaft 22, the fan blades 23 are operated to create a forced current of air through the chute 56 and nozzle 58, to forcibly discharge the seed delivered from the receiver 30 into the casing 20, from the nozzle over the area to be planted.

Simultaneous with the discharging of the seed from the nozzle 58 is the action of the rack bar 63 which is also operated from the shaft 7, to swing or oscillate the nozzle so that the desired area can be covered as the vehicle carrying the planting mechanism moves forwardly.

The clutch mechanism operated by the lever 11 may be employed to stop the operation of the seed distributor when necessary and can be operated without danger of the driving chain jumping off of the driven sprocket wheel as this sprocket does not move upon the shaft.

With the mechanism described, it will be readily understood that this seed planting operation can be carried out with a minimum of labor and that a wide area can be quickly and evenly seeded.

Having described the invention what we claim is:—

A broadcast seeder comprising a supporting body constituting a wagon end gate, a pair of brackets carried by and depending from the lower edge of the end gate each adjacent one side thereof, a drive shaft carried by said brackets beneath the lower edge of the gate body, a bracket carried by the gate body at the central portion of the lower edge thereof and overlying the drive shaft, a seed distributing nozzle pivotally supported upon said bracket, a blower fan housing supported in close proximity to the body above and discharging downwardly into said nozzle, means for delivering a predetermined quantity of seed to said housing, a second shaft arranged in close proximity to the body above the first mentioned shaft and having one end extending into said housing to support a blower fan, a supporting connection at one end of the gate body between said shafts, means for coupling the first mentioned shaft with a source of power, and means for oscillating said nozzle during the supplying of seed thereto by the fan, comprising a worm mounted upon the first mentioned shaft, a gear mounted upon the body and connected with the worm, a gear segment carried by the nozzle, and a rack reciprocably connected with the gear and engaging the segment and operating in close proximity to the gate body and moving transversely of the face thereof.

In testimony whereof we hereunto affix our signatures.

FRANK E. WELSH.
JACOB E. DIEFENDERFER.